(12) United States Patent
Murata et al.

(10) Patent No.: US 9,152,408 B2
(45) Date of Patent: Oct. 6, 2015

(54) PROGRAM UPDATE DEVICE

(75) Inventors: Kenichi Murata, Tokyo (JP); Noriaki Inoue, Kobe (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 175 days.

(21) Appl. No.: 13/806,065

(22) PCT Filed: Jun. 23, 2010

(86) PCT No.: PCT/JP2010/060641
§ 371 (c)(1),
(2), (4) Date: Feb. 7, 2013

(87) PCT Pub. No.: WO2011/161778
PCT Pub. Date: Dec. 29, 2011

(65) Prior Publication Data
US 2013/0132939 A1 May 23, 2013

(51) Int. Cl.
G06F 9/445 (2006.01)
G06F 9/44 (2006.01)
H02J 7/04 (2006.01)
B60L 11/18 (2006.01)

(52) U.S. Cl.
CPC ............... *G06F 8/65* (2013.01); *B60L 11/1838* (2013.01); *H02J 7/041* (2013.01); *B60L 2230/16* (2013.01); *B60L 2260/58* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
CPC ....... H02J 7/041; H02J 9/002; B60L 11/1838; Y02T 90/128; Y02T 90/163; G06F 8/65
USPC .................................................. 717/168, 178
See application file for complete search history.

(56) References Cited

U.S. PATENT DOCUMENTS

| | | | | |
|---|---|---|---|---|
| 6,014,597 A * | 1/2000 | Kochanneck | ................... | 701/22 |
| 7,259,539 B2 * | 8/2007 | Suzuki et al. | ................. | 320/110 |
| 7,911,080 B2 * | 3/2011 | Turski et al. | ................. | 307/10.7 |
| 2002/0019877 A1 | 2/2002 | Wrede | | |
| 2003/0224761 A1 * | 12/2003 | Goto | ........................ | 455/412.1 |
| 2004/0073901 A1 * | 4/2004 | Imamatsu | ..................... | 717/170 |
| 2005/0129010 A1 * | 6/2005 | Maeda et al. | ................. | 370/389 |

(Continued)

FOREIGN PATENT DOCUMENTS

JP 2002-157127 A 5/2002
JP 2003-309511 A 10/2003

(Continued)

*Primary Examiner* — Ryan Coyer
(74) *Attorney, Agent, or Firm* — Kenyon & Kenyon LLP

(57) ABSTRACT

A program update device that is provided in a vehicle in which a battery can be charged from the outside and updates a software program used in the vehicle includes a charging time acquiring unit that acquires the charging time of the battery, an update time acquiring unit that acquires the time required to rewrite the program, a comparison unit that compares the charging time acquired by the charging time acquiring unit and the program rewrite time acquired by the update time acquiring unit, and an update unit that rewrites the program on the basis of the comparison result of the comparison unit. According to this structure, it is possible to appropriately determine a program which can be updated within the battery charging time and reliably update the program while the vehicle is being charged.

4 Claims, 4 Drawing Sheets

(56) References Cited

U.S. PATENT DOCUMENTS

| | | | |
|---|---|---|---|
| 2006/0279256 A1* | 12/2006 | Bletsas | 320/128 |
| 2007/0210743 A1 | 9/2007 | Tabei et al. | |
| 2008/0080458 A1* | 4/2008 | Cole | 370/342 |
| 2009/0300595 A1* | 12/2009 | Moran et al. | 717/170 |
| 2010/0019719 A1* | 1/2010 | Okabayashi | 320/106 |
| 2010/0315197 A1* | 12/2010 | Solomon et al. | 340/5.2 |
| 2011/0244794 A1* | 10/2011 | Nakano | 455/41.1 |
| 2012/0112694 A1* | 5/2012 | Frisch et al. | 320/109 |

FOREIGN PATENT DOCUMENTS

| | | | |
|---|---|---|---|
| JP | 2004-096973 A | | 3/2004 |
| JP | 2005-349878 A | | 12/2005 |
| JP | 2007-034815 A | | 2/2007 |
| JP | 2007-062642 A | | 3/2007 |
| JP | 2007062642 A | * | 3/2007 |
| JP | 2007-150908 A | | 6/2007 |
| JP | 2007-237905 A | | 9/2007 |
| JP | 2008-278740 A | | 11/2008 |
| WO | 2009/148118 A1 | | 10/2009 |

* cited by examiner

PROGRAM UPDATE DEVICE

This is a 371 national phase application of PCT/JP2010/060641 filed 23Jun. 2010, the contents of which are incorporated herein by reference.

TECHNICAL FIELD

The present invention relates to a program update device that is provided in a vehicle in which a battery can be changed from the outside and updates a software program used in the vehicle.

BACKGROUND ART

The vehicle includes various ECUs [Electronic Control Units], such as a vehicle control ECU and a body ECU. These ECUs are operated by software. In some cases, a software program is updated in order to improve the operation function of the software or add functions. In the update of a vehicle program, in some cases, the rewrite data of the program is downloaded from the center to the vehicle by communication means and the program is updated. While the program is being updated, it is necessary to stop the function of the ECU, which is an update target. Therefore, the program is updated when the vehicle is stopped. In the device disclosed in Patent Literature 1, when there is software which can be updated, the software is updated when the user stops the vehicle.

In the case of a vehicle, such as a plug-in hybrid vehicle or an electric vehicle in which the battery can be charged from the outside, when charging is performed, the vehicle is stopped. Since it takes a time for charging, it is appropriate to update the program during charging.

CITATION LIST

Patent Literature

[Patent Literature 1] Japanese Unexamined Patent Application Publication No. 2005-349878
[Patent Literature 2] Japanese Unexamined Patent Application Publication No. 2008-278740
[Patent Literature 3] Japanese Unexamined Patent Application Publication No. 2007-237905
[Patent Literature 4] Japanese Unexamined Patent Application Publication No. 2007-34815
[Patent Literature 5] Japanese Unexamined Patent Application Publication No. 2002-157127

SUMMARY OF INVENTION

Technical Problem

However, in some cases, when the size of the rewrite data of the program is large, it takes a long time to update the program. In this case, since the vehicle does not know when the user starts to drive the vehicle, the update of the program is likely to be interrupted due to the start of driving.

An object of the invention is to provide a program update device capable of reliably updating a program while the vehicle is being charged.

Solution to Problem

According to the invention, there is provided a program update device that is provided in a vehicle in which a battery can be charged from the outside and updates a software program used in the vehicle. The program update device includes: a charging time acquiring unit that acquires a charging time of the battery; an update time acquiring unit that acquires a time required to update the program; a comparison unit that compares the charging time acquired by the charging time acquiring unit and the program update time acquired by the update time acquiring unit; and an update unit that updates the program on the basis of the comparison result of the comparison unit.

The program update device is provided in the vehicle in which the battery can be charged from the outside and updates the program while the vehicle is being charged (that is, while the vehicle is stopped). Therefore, in the program update device, the charging time acquiring unit acquires the charging time of the battery. For example, in some cases, as the charging time, the following are acquired: the charging time or charging end time designated by the user; the travelable distance or time designated by the user; and the charging time predicted from, for example, charging power. In the program update device, the update time acquiring unit acquires the time required to update the program, which is an update target. As the program update time, the following are used: when one program is an update target, the update time of the one program; when a plurality of programs are update targets, the total update time of the plurality of programs or the update time of each of the programs. The vehicle is stopped while at least the battery is being charged. The charging time can be used as a criterion for determining whether the vehicle does not travel. The update of the program is not interruption within the charging time. In the program update device, the comparison unit compares the battery charging time and the program update time and the update unit updates the program on the basis of the comparison result. As such, in the program update device, since the battery charging time is compared with the program update time, it is possible to appropriately determine the program which can be updated within the battery charging time and reliably update the program while the vehicle is being charged.

In the program update device according to the invention, the update unit may update the program in which the program update time acquired by the update time acquiring unit is less than the charging time acquired by the charging time acquiring unit. As such, in the program update device, since the program with the program update time less than the battery charging time is updated, it is possible to reliably complete the update of the program while the vehicle is being charged.

In the program update device according to the invention, a charging connector may be locked while the program is being updated. As such, in the program update device, since the charging connector is locked while the program is being updated, it is possible to prevent the disconnection of the charging connector (the interruption of charging) while the program is being updated. Therefore, it is possible to reliably prevent the update of the program from being interrupted due to the interruption of charging and the start of the traveling of the vehicle.

In the program update device according to the invention, data required to update the program may be downloaded while the vehicle is traveling. As such, in the program update device, since the data required to update the program is downloaded while the vehicle is traveling, it is possible to rapidly start the update of the program when charging starts.

The update of the software program includes the removal of a program, the addition of a program, the rewriting of a software program whose version is to be upgraded, and the rewriting of a software program for changing a logic circuit in a semiconductor device.

Advantageous Effects of Invention

According to the invention, since the battery charging time is compared with the program update time, it is possible to appropriately determine a program which can be updated in the battery charging time and reliably update the program while the vehicle is being charged.

DESCRIPTION OF EMBODIMENTS

Figure 1:
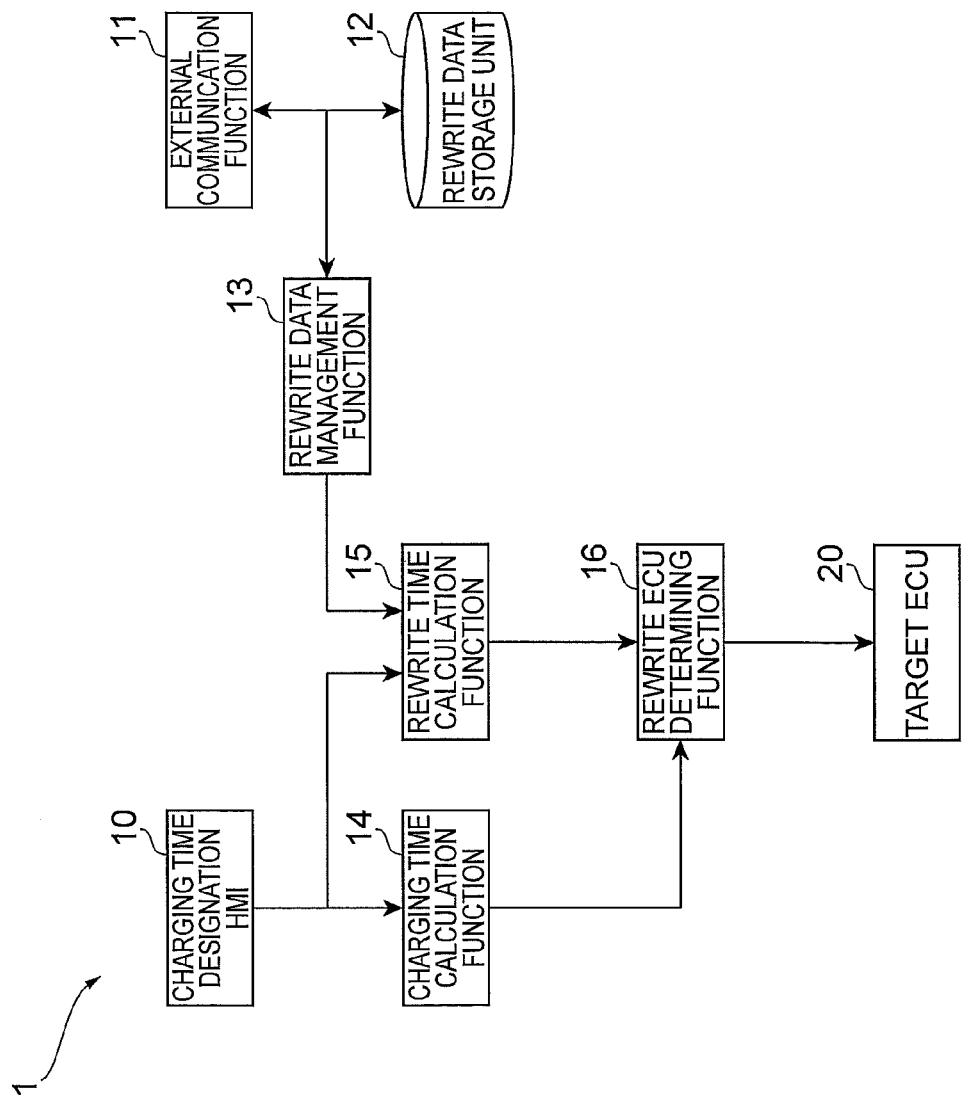
FIG. 1 is a diagram illustrating the structure of a reprogramming system according to a first embodiment.

Hereinafter, a program update device according to an embodiment of the invention will be described with reference to the accompanying drawings. In the drawings, the same or equivalent components are denoted by the same reference numerals and the description thereof will not be repeated.

In this embodiments, the program update device according to the invention is applied to a reprogramming system which is provided in a vehicle, such as a plug-in hybrid vehicle or an electric vehicle in which a battery can be charged from the outside. The reprogramming system according to this embodiment can perform wireless or wired communication with a center that manages various kinds of vehicle application software (programs). When the center has rewrite data of an arbitrary program, the reprogramming system according to this embodiment downloads the rewrite data of the program from the center and an ECU, which is a rewrite target, updates (reprograms) the program while the vehicle is stopped. In the invention, there are two embodiments. A first embodiment is a basic embodiment and a second embodiment is configured by adding a function of preventing the interruption of charging to the basic embodiment.

A reprogramming system 1 according to the first embodiment will be described with reference to FIG. 1. FIG. 1 is a diagram illustrating the structure of the reprogramming system according to the first embodiment.

The reprogramming system 1 uses a battery charging time as a criterion for determining whether the vehicle is not traveling (the vehicle is stopped) and reprograms the program which can be reprogrammed within the charging time. Therefore, the reprogramming system 1 includes a charging time designation HMI [Human Machine Interface] 10, an external communication function 11, a rewrite data storage unit 12, a rewrite data management function 13, a charging time calculation function 14, a rewrite time calculation function 15, and a rewrite ECU determining function 16. Each target ECU 20 performs reprogramming.

In this embodiment, the charging time calculation function 14 functions as a charging time acquiring unit in the claims, the rewrite time calculation function 15 functions as an update time acquiring unit in the claims, the rewrite ECU determining function 16 functions as a comparison unit in the claims, and the target ECU 20 functions as an update unit in the claims.

The charging time designation HMI 10 is an HMI used by the user (for example, the driver) of the vehicle to input a charging method in order to designate the charging time. Examples of the charging method include a charging method of directly designating the charging time (including the designation of the end time), a charging method of designating a distance or time that can be traveled, and a charging method of designating detailed electric energy (including full charge). An example of the HMI is a display having an input function, such as a touch panel or a joystick. In addition, the user may input the charging method to a charging facility outside the vehicle and the input information may be received from the charging facility through a charging cable by power line communication or wireless communication.

The external communication function 11, the rewrite data storage unit 12, the rewrite data management function 13, the charging time calculation function 14, the rewrite time calculation function 15, and the rewrite ECU determining function 16 may be provided in ECUs which are associated with each other in the vehicle, or they may be integrally provided in an ECU for only the reprogramming system 1. When they are provided in the ECUs, for example, the external communication function 11, the rewrite data storage unit 12, and the rewrite data management function 13 are provided in a communication ECU, the charging time calculation function 14 is provided in a battery management ECU, and the rewrite time calculation function 15 and the rewrite ECU determining function 16 are provided in a navigation ECU or the communication ECU.

The external communication function 11 is a function for communicating with outside of the vehicle and includes a communication device corresponding to a communication method. Examples of the communication method include wireless communication using, for example, DCM [Date Communication Module], wireless communication through a portable terminal of the user, and wired communication, such as power line communication. When the center has the rewrite data of the program, the external communication function 11 receives the rewrite data using wireless communication while the vehicle is traveling or is stopped. Alternatively, when the center has the rewrite data of the program, the external communication function 11 receives the rewrite data using wired communication through, for example, the charging cable while the vehicle is being charged (the vehicle is stopped).

The rewrite data storage unit 12 is a storage area which is secured in a memory of the ECU having the rewrite data management function 13. Whenever the rewrite data of the program is downloaded, it is stored in the rewrite data storage unit 12. In addition, whenever rewriting with the rewrite data is completed in the target ECU 20, the rewrite data is removed from the rewrite data storage unit 12.

The rewrite data management function 13 is a function for managing the rewrite data of the program of the ECU. The rewrite data management function 13 periodically inquires of the center about the absence or presence of the rewrite data of the program of each ECU provided in the host vehicle using the external communication function 11. Alternatively, when the external communication function 11 receives, for example, a POP signal from the center, the rewrite data management function 13 determines whether there is the rewrite data of the program of each ECU provided in the host vehicle from the received information. When there is the rewrite data of the program in the center, the rewrite data management function 13 downloads the rewrite data of the program from the center using the external communication function 11 and stores the rewrite data in the rewrite data storage unit 12.

When rewriting with the rewrite data stored in the rewrite data storage unit 12 is completed, the rewrite data management function 13 removes the rewrite data from the rewrite data storage unit 12.

The charging time calculation function 14 is a function for calculating the time required for charging. When the user inputs the charging method using the charging time designation HMI 10, the charging time calculation function 14 determines whether the user designates the charging time as the charging method. In the case of a charging method other than the charging time, the charging time calculation function 14 calculates the predicted charging time corresponding to the charging method. The predicted charging time is calculated, considering, for example, the power transmission capability of the charging facility, the power reception capability of the vehicle including the battery, the conditions (for example, deterioration) of the battery. The conditions of the battery can be determined from, for example, a charging history. The charging time is calculated according to the conditions of the battery since the changing time is likely to vary depending on the conditions of the battery in the same charging method (for example, a charging method designating the same electric energy). When the user inputs the charging time as the charging method, the charging time calculation function 14 uses the input charging time, without calculating the charging time.

The rewrite time calculation function 15 is a function for calculating the time required to rewrite the program, which is a rewrite target. The rewrite time calculation function 15 determines whether there is the rewrite data of the program. When there is the rewrite data of the program, the rewrite time calculation function 15 calculates the rewrite time of each ECU 20 for each program, which is a rewrite target, using a rewrite time calculation expression that is provided in advance from each ECU 20, which is a rewrite target. For example, since a rewrite method, the size of the rewrite data of the program, and a data arrangement method are different in the ECUs, different calculation expressions are used for each ECU. When there are a plurality of programs, which are rewrite targets, the rewrite time calculation function 15 integrates the program rewrite time of each ECU 20 and calculates a total rewrite time. When there is one program, which is a rewrite target, the rewrite time of the program is the total rewrite time. In particular, when rewriting is performed while the rewrite data is being downloaded, the rewrite time calculation function 15 decides the download time in advance and then calculates the rewrite time.

The rewrite ECU determining function 16 is a function for determining an ECU (program) which can perform rewriting within the charging time among the ECUs 20 (programs), which are rewrite targets. When the charging time calculation function 14 calculates the charging time (or the user designates the charging time) and the rewrite time calculation function 15 calculates the total rewrite time, the rewrite ECU determining function 16 determines whether the charging time is equal to or more than the total rewrite time. When the charging time is equal to or more than the total rewrite time, the rewrite ECU determining function 16 determines to perform rewriting in all of the ECUs 20 which are rewrite targets. When the charging time is less than the total rewrite time, the rewrite ECU determining function 16 extracts an appropriate ECU (program) which can perform rewriting within the charging time from the ECUs 20 (programs), which are rewrite targets. As the extracting method, for example, when there are a plurality of ECUs 20 (programs), which are rewrite targets, combinations thereof are examined (in some cases, the ECUs are independently examined), the rewrite time between the combinations and the charging time are compared, and the most effective combination within the charging time is extracted. When there is one ECU 20 (program), which is a rewrite target, extraction is not performed (rewriting is not performed). As a method of extracting the most effective combination, for example, when there are a plurality of ECUs (ECUs which are interdependent) which are associated with each other and require rewriting, the plurality of ECUs are extracted. When there is an ECU with high priority on traveling or safety, the ECU with high priority is extracted. Then, the rewrite ECU determining function 16 instructs each target ECU 20 which is determined to perform rewriting to perform rewriting. When the rewrite data is rewritten during charging while being downloaded, for example, the rewrite ECU determining function 16 stops the rewriting when it is determined that the communication time required for download cannot be ensured (furthermore, when the time required for rewriting increases).

The target ECU 20 is provided in the host vehicle and is a program rewrite target ECU. When a rewrite instruction is received from the rewrite ECU determining function 16, the target ECU 20 rewrites the program using the rewrite data stored in the rewrite data storage unit 12.

Figure 2:
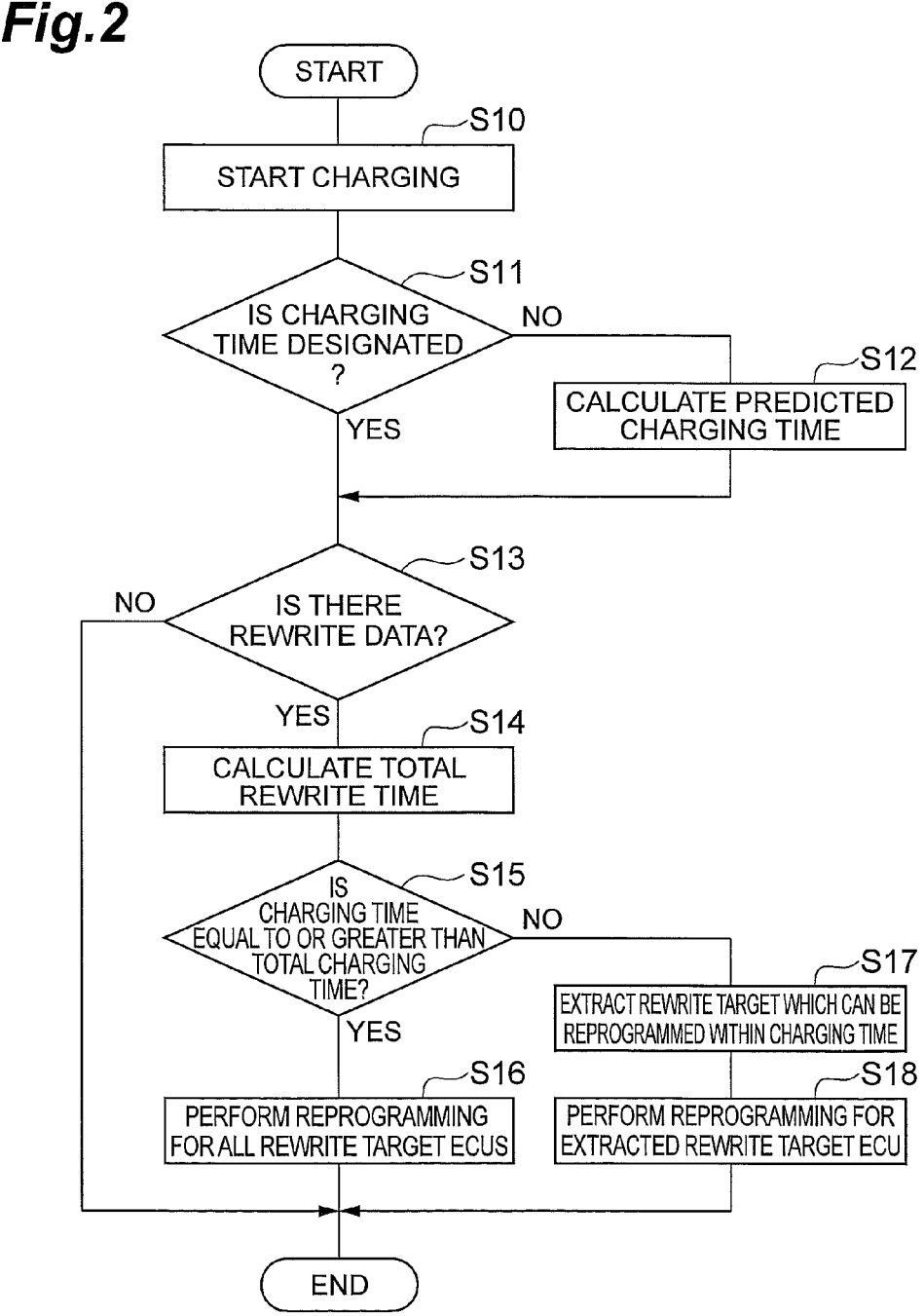
FIG. 2 is a flowchart illustrating the flow of the process of the reprogramming system according to the first embodiment.

Next, the operation of the reprogramming system 1 will be described with reference to FIG. 1 using the flowchart shown in FIG. 2. FIG. 2 is a flowchart illustrating the flow of the process of the reprogramming system according to the first embodiment.

In the case of a vehicle which wirelessly communicates with the center, while the host vehicle is traveling, the rewrite data management function 13 communicates with the center using the external communication function 11 and checks whether the center has the rewrite data of the program of the ECU provided in the host vehicle. When the center has the rewrite data, the rewrite data management function 13 downloads the rewrite data from the center using the external communication function 11 and stores the downloaded rewrite data in the rewrite data storage unit 12.

The host vehicle stops in a place where the charging facility is provided in order to perform charging. Then, the user of the host vehicle inputs the charging method to the charging time designation HMI 10 and inserts the charging connector into the charging facility. Then, charging starts (S10). In the case of a vehicle which performs power line communication with the center, the rewrite data management function 13 communicates with the center through the charging cable using the external communication function 11. Then, similarly to the above, the rewrite data management function 13 checks whether there is rewrite data in the center. When there is rewrite data, the rewrite data management function 13 downloads the rewrite data during charging.

The charging time calculation function 14 determines whether the charging time is designated on the basis of the charging method input by the user (S11). When it is determined in S11 that the charging time is not designated, the charging time calculation function 14 calculates the predicted charging time according to the charging method (S12). When it is determined in S11 that the charging time is designated, the designated charging time is used.

The rewrite time calculation function 15 determines whether there is the rewrite data of the program (S13). When it is determined in S13 that there is no rewrite data, it is not necessary to perform reprogramming and the process ends. When it is determined in S13 that there is rewrite data, the rewrite time calculation function 15 calculates the rewrite time of each program, which is a rewrite target, and calculates the total rewrite time of all programs, which are rewrite targets (S14).

The rewrite ECU determining function 16 determines whether the charging time is equal to or more than the total rewrite time of the programs (S15). When it is determined in S15 that the charging time is equal to or more than the total rewrite time, the rewrite ECU determining function 16 determines to rewrite all programs (all target ECUs 20), which are rewrite targets. Then, the rewrite ECU determining function 16 instructs all target ECUs 20 to perform rewriting (S16). All of the instructed target ECUs 20 perform reprogramming using the rewrite data stored in the rewrite data storage unit 12 (S16).

When it is determined in S15 that the charging time is less than the total rewrite time, the rewrite ECU determining function 16 extracts the programs (target ECUs 20) which can be reprogrammed within the charging time from all programs (all target ECUs 20), which are rewrite targets (S17). Then, the rewrite ECU determining function 16 instructs the extracted target ECUs 20 to perform rewriting (S18). Each of the instructed target ECUs 20 performs reprogramming using the rewrite data stored in the rewrite data storage unit 12 (S18). When the charging time is less than the total rewrite time and there is one program to be rewritten, reprogramming is not performed.

Until the reprogramming performed in S16 or S18 completely ends, at least charging is continuously performed. During charging, the host vehicle is maintained in the stopped state and reprogramming is not interrupted.

According to the reprogramming system 1, it is possible to appropriately determine a program (ECU) which can be reprogrammed within the charging time and reliably perform reprogramming while the vehicle is being charged (the vehicle is stopped). In addition, in the reprogramming system 1, when the rewrite data is downloaded while the vehicle is traveling, it is possible to rapidly start reprogramming at the time when charging starts.

Figure 3:
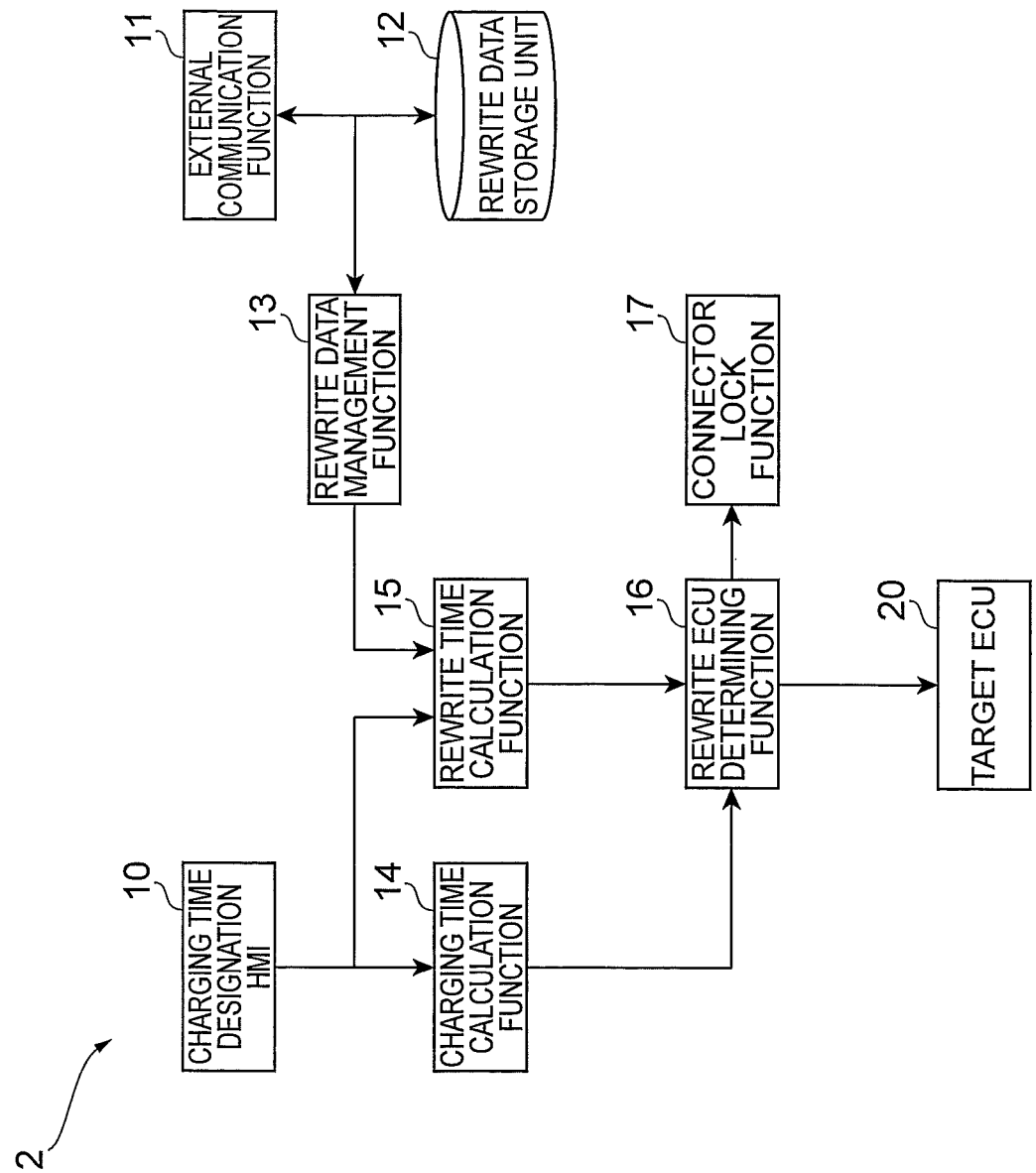
FIG. 3 is a diagram illustrating the structure of a reprogramming system according to a second embodiment.

Next, a reprogramming system 2 according to a second embodiment will be described with reference to FIG. 3. FIG. 3 is a diagram illustrating the structure of the reprogramming system according to the second embodiment.

The reprogramming system 2 differs from the reprogramming system 1 according to the first embodiment in that, when reprogramming is performed, a charging connector is locked in order to prevent the interruption of charging (furthermore, the start of traveling). Therefore, the reprogramming system 2 includes a connector lock function 17, in addition to a charging time designation HMI 10, an external communication function 11, a rewrite data storage unit 12, a rewrite data management function 13, a charging time calculation function 14, a rewrite time calculation function 15, and a rewrite ECU determining function 16. Here, only the connector lock function 17 will be described.

The connector lock function 17 is a function which locks the charging connector. The connector lock function 17 locks the charging connector from the vehicle before reprogramming starts and unlocks the charging connector when reprogramming ends.

Figure 4:
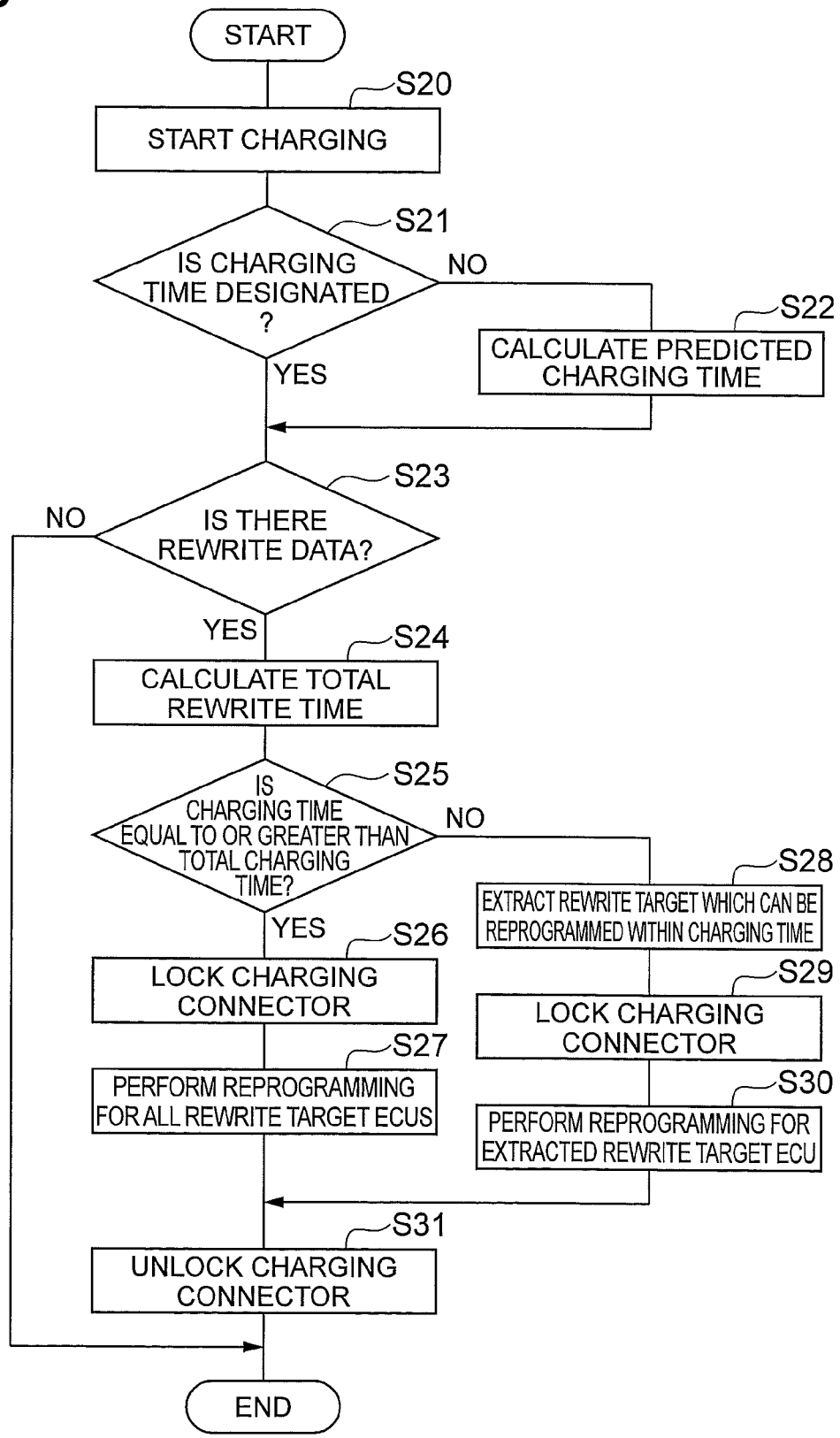
FIG. 4 is a flowchart illustrating the flow of the process of the reprogramming system according to the second embodiment.

Next, the operation of the reprogramming system 2 will be described with reference to FIG. 3 using the flowchart shown in FIG. 4. FIG. 4 is a flowchart illustrating the flow of the process of the reprogramming system according to the second embodiment.

When there is the rewrite data of the program in the center, the reprogramming system 2 downloads the rewrite data and stores the rewrite data in the rewrite data storage unit 12 using the same operation as the reprogramming system 1 according to the first embodiment, during the traveling of the host vehicle.

When the host vehicle is stopped and charging starts (S20), the reprogramming system 2 performs the same operation as the reprogramming system 1 according to the first embodiment until determining whether the charging time is equal to or more than the total rewrite time of the programs (S25).

When it is determined in S25 that the charging time is equal to or more than the total rewrite time, the rewrite ECU determining function 16 determines to rewrite all programs which are rewrite targets. The connector lock function 17 locks the charging connector (S26). Then, the rewrite ECU determining function 16 instructs all target ECUs 20 to perform rewriting (S27). All of the instructed target ECU 20s perform reprogramming (S27).

When it is determined in S25 that the charging time is less than the total rewrite time, the rewrite ECU determining function 16 extracts programs which can be reprogrammed within the charging time from all programs, which are rewrite targets (S28). The connector lock function 17 locks the charging connector (S29). Then, the rewrite ECU determining function 16 instructs the extracted target ECUs 20 to perform rewriting (S30). Each of the instructed target ECUs 20 performs reprogramming (S30).

When reprogramming is completed in S27 or S30, the connector lock function 17 unlocks the charging connector (S31). As such, until the executed reprogramming completely ends, the charging connector is locked and cannot be disconnected. Therefore, charging cannot be interrupted.

The reprogramming system 2 has the following effect in addition to the effect of the reprogramming system 1 according to the first embodiment. According to the reprogramming system 2, since the charging connector is locked during reprogramming, it is possible to reliably prevent the disconnection of the charging connector (the interruption of charging) during reprogramming. In this way, it is possible to prevent the interruption of charging and the start of the traveling of the vehicle. Therefore, it is possible to reliably prevent the interruption of the reprogramming.

The embodiments of the invention have been described above. However, the invention is not limited to the above-described embodiments, but various modifications and changes of the invention can be made.

For example, in this embodiment, the charging time is compared with the total rewrite time of all programs which are rewrite targets. However, other methods may be used as the method of comparing the charging time with the rewrite time (update time) of the program.

In addition, in this embodiment, the calculation expression is used to calculate the rewrite time of the program in each case. However, for example, the rewrite time of each program may be calculated in advance, a correspondence table between the program and the rewrite time may be stored in advance, and the rewrite time may be acquired from the correspondence table.

In this embodiment, the invention is applied to the reprogramming system which rewrites the program in order to upgrade the version of vehicle application software. However, the invention can be applied to a programmable logic device (for example, FPGA [Field Programmable Gate Array]) which rewrites a software program for changing a logic circuit, or can be applied to add or remove a software program.

INDUSTRIAL APPLICABILITY

According to the invention, the program update device provided in the vehicle in which the battery can be charged from the outside compares the battery charging time with the program update time. Therefore, it is possible to appropriately determine a program which can be updated within the battery charging time and reliably update the program while the vehicle is being charged.

REFERENCE SIGNS LIST 1, 2: REPROGRAMMING SYSTEM
10: CHARGING TIME DESIGNATION HMI
11: EXTERNAL COMMUNICATION FUNCTION
12: REWRITE DATA STORAGE UNIT
13: REWRITE DATA MANAGEMENT FUNCTION
14: CHARGING TIME CALCULATION FUNCTION
15: REWRITE TIME CALCULATION FUNCTION
16: REWRITE ECU DETERMINING FUNCTION
17: CONNECTOR LOCK FUNCTION
20: TARGET ECU

The invention claimed is:

1. A program update device that is provided in a vehicle in which a battery can be charged from the outside and which can download rewrite data of a plurality of software programs used in the vehicle when there is the rewrite data of the plurality of programs, and rewrite the plurality of programs with the rewrite data, comprising:
 a charging time acquiring unit that acquires a charging time of the battery;
 an update time acquiring unit that acquires a total rewrite time required to rewrite the plurality of programs;
 a comparison unit that compares the charging time acquired by the charging time acquiring unit and the total rewrite time acquired by the update time acquiring unit;
 an update unit that rewrites one or more of the plurality of programs on the basis of the comparison result of the comparison unit; and
 a lock unit that locks a charging connector before the update unit starts to rewrite the one or more of the plurality of programs and unlocks the charging connector when the update unit ends the rewriting of the one or more of the plurality of programs, wherein
  when the charging time is less than the total rewrite time, the comparison unit extracts a combination of programs capable of being rewritten within the charging time, and the update unit rewrites the extracted combination of programs.

2. The program update device according to claim 1, wherein the update unit rewrites the program in which the program rewrite time acquired by the update time acquiring unit is less than the charging time acquired by the charging time acquiring unit.

3. The program update device according to claim 1, wherein the rewrite data of the program is downloaded while the vehicle is traveling.

4. A program update system comprising:
 a center that manages a vehicle program; and
 a vehicle in which a battery can be charged by a charging facility and which can communicate with the center, download rewrite data of a plurality of software programs used in the vehicle when the center has the rewrite data of the plurality of programs, and rewrite the plurality of programs with the rewrite data, wherein the vehicle includes
  a charging time acquiring unit that acquires a charging time of the battery;
  an update time acquiring unit that acquires a total rewrite time required to rewrite the plurality of programs;
  a comparison unit that compares the charging time acquired by the charging time acquiring unit and the total rewrite time acquired by the update time acquiring unit;
  an update unit that rewrites one or more of the plurality of programs on the basis of the comparison result of the comparison unit, and
  a lock unit that locks a charging connector before the update unit starts to rewrite the one or more of the plurality of programs and unlocks the charging connector when the update unit ends the rewriting of the one or more of the plurality of programs, wherein
   when the charging time is less than the total rewrite time, the comparison unit extracts a combination of programs capable of being rewritten within the charging time, and the update unit rewrites the extracted combination of programs.

* * * * *